(12) United States Patent
Schneider et al.

(10) Patent No.: US 7,776,929 B2
(45) Date of Patent: Aug. 17, 2010

(54) METHOD FOR THE PRODUCTION OF DEFOAMER FORMULATIONS

(75) Inventors: Otto Schneider, Burghausen (DE); Willibald Burger, Burghausen (DE); Holger Rautschek, Nuenchritz (DE)

(73) Assignee: Wacker Chemie AG, Munich (DE)

( * ) Notice: Subject to any disclaimer, the term of this patent is extended or adjusted under 35 U.S.C. 154(b) by 418 days.

(21) Appl. No.: 11/816,020

(22) PCT Filed: Feb. 9, 2006

(86) PCT No.: PCT/EP2006/001155

§ 371 (c)(1), (2), (4) Date: Aug. 10, 2007

(87) PCT Pub. No.: WO2006/087137

PCT Pub. Date: Aug. 24, 2006

(65) Prior Publication Data

US 2008/0064806 A1 Mar. 13, 2008

(30) Foreign Application Priority Data

Feb. 17, 2005 (DE) .................. 10 2005 007 313

(51) Int. Cl.
 *C09K 3/00* (2006.01)
 *C08L 83/06* (2006.01)

(52) U.S. Cl. .................. 516/117; 524/492; 524/588

(58) Field of Classification Search .................. 524/493
 See application file for complete search history.

(56) References Cited

U.S. PATENT DOCUMENTS

| | | | |
|---|---|---|---|
| 3,113,930 A | 12/1963 | Cehvalier | |
| 3,383,327 A * | 5/1968 | Sullivan | 516/117 |
| 3,455,839 A * | 7/1969 | Rauner | 516/117 |
| 3,560,401 A * | 2/1971 | O'Hara et al. | 516/117 |
| 3,746,653 A * | 7/1973 | Churchfield | 516/118 |
| 4,101,443 A | 7/1978 | Rosen et al. | |
| 4,145,308 A * | 3/1979 | Simoneau et al. | 516/118 |
| 4,443,357 A * | 4/1984 | Maloney et al. | 516/117 |
| 4,486,336 A * | 12/1984 | Pape et al. | 516/117 |
| 4,639,489 A | 1/1987 | Aizawa et al. | |
| 4,690,713 A * | 9/1987 | Terae et al. | 106/287.16 |
| 4,749,740 A * | 6/1988 | Aizawa et al. | 524/588 |
| 5,080,828 A * | 1/1992 | Terae | 516/120 |
| 5,082,590 A * | 1/1992 | Araud | 516/121 |
| 5,283,004 A * | 2/1994 | Miura | 516/117 |
| 5,486,306 A * | 1/1996 | L'Hostis et al. | 516/117 |
| 5,725,815 A * | 3/1998 | Wollenweber et al. | 264/41 |
| 5,914,362 A * | 6/1999 | Brecht et al. | 524/268 |
| 6,512,015 B1 * | 1/2003 | Elms et al. | 516/118 |
| 6,605,183 B1 * | 8/2003 | Rautschek et al. | 162/72 |
| 6,656,975 B1 | 12/2003 | Christiano et al. | |
| 2004/0106749 A1 | 6/2004 | Burger et al. | |

FOREIGN PATENT DOCUMENTS

| | | |
|---|---|---|
| CH | 526 324 A | 8/1972 |
| DE | 2551260 A1 | 5/1977 |
| DE | 28 29 261 A1 | 1/1979 |
| DE | 29 03 725 A1 | 8/1980 |
| DE | 195 046 45 C1 | 10/1996 |
| DE | 102 55 649 A1 | 6/2004 |
| EP | 0 023 533 A1 | 2/1981 |
| EP | 0 163 541 B1 | 4/1992 |
| EP | 0 887 097 A1 | 12/1998 |
| EP | 1 060 778 A1 | 12/2000 |
| EP | 1 076 073 A1 | 2/2001 |
| GB | 1 549 884 A1 | 8/1979 |

OTHER PUBLICATIONS

Gelest technical bulletin, Reactive Silicones: Forging New Polymer Links, 2004, 64 pages.*
English Abstract corresponding to DE 29 03 725 A1.
English Abstract corresponding to EP 0 023 533 A.
English Abstract corresponding to DE 195 046 45 C1.
English Abstract corresponding to EP 1 076 073 A.
English Abstract corresponding to EP 0 887 097 A.
English Abstract corresponding to EP 1 060 778 A.
English Abstract corresponding to DE 2551260 A.
Patterson, Robert E., Colloids Surf., A; 74(1), 1993, pp. 115-126.

* cited by examiner

*Primary Examiner*—Randy Gulakowski
*Assistant Examiner*—Robert Loewe
(74) *Attorney, Agent, or Firm*—Brooks Kushman P.C.

(57) ABSTRACT

Defoamer compositions which exhibit both high defoaming activity as well as good storage stability are prepared by mixing at least an organopolysiloxane having a defined but limited fraction of silicon-bonded hydroxyl and/or alkoxy groups and hydrophilic silica, followed by heating until the viscosity of the mixture has fallen to less than 50% of its value prior to heating.

19 Claims, No Drawings

METHOD FOR THE PRODUCTION OF DEFOAMER FORMULATIONS

CROSS-REFERENCE TO RELATED APPLICATION

This application is the U.S. national phase of PCT Appln. No. PCT/EP2006/001155 filed Feb. 9, 2006 which claims priority to German application 10 2005 007 313.1 filed Feb. 17, 2005.

BACKGROUND OF THE INVENTION

1. Field of the Invention

The invention relates to a method for the production of defoamer formulations using hydrophilic silica.

2. Description of the Related Art

In numerous liquid systems, more particularly aqueous systems which include surface-active compounds as desired or else unwanted constituents, it is possible for problems to occur as a result of foaming if these systems are contacted more or less intensely with gaseous substances, such as during the introduction of gases into wastewaters, during intense stirring of liquids, during distillation, washing or coloring operations or during dispensing operations, for example.

This foam can be controlled by mechanical means or through the addition of defoamers. Siloxane-based defoamer formulations have proven particularly appropriate here.

Defoamer formulations based on siloxanes are produced, for example, in accordance with U.S. Pat. No. 3,383,327 A by heating hydrophilic silica in polydimethylsiloxanes.

The production of defoamer formulations using polysiloxanes containing alkoxy or hydroxyl groups is likewise known. It involves, for example, using polysiloxanes which on average carry more than one alkoxy group per silicon atom (DE 2903725). This high concentration of functional groups, however, results in poor stability in the foaming media, leading in part to an action which rapidly subsides. This is desirable in those instances, for example, where the defoamer formulation is intended to act only during dispensing operations, but is not to suppress the foam later on (U.S. Pat. No. 4,101,443 A). For the majority of applications, however, it tends to be a disadvantage.

EP 163541 B1 describes a method for the production of defoamer formulations that react polysiloxanes having terminal hydroxyl groups with other siloxanes, under the action of catalysts, to form branched siloxanes. These branched siloxanes are then heated together with low molecular weight polysiloxanes (e.g., having a viscosity of 10-50 mm²/s) having two terminal hydroxyl groups and with hydrophilic silica. The resultant defoamer formulations have a very high viscosity, which is a disadvantage for practical use.

Patterson, Robert E. (Colloids Surf., A; 74(1); 115 26; 1993) likewise describes the production of defoamer formulations using hydrophilic silica and polydimethylsiloxanes containing terminal hydroxyl groups. A molecular weight of 4000 to 18,000 g/mol for this polysiloxane is said to be optimum for defoaming action in the black liquor produced during papermaking. As the skilled worker can easily calculate, this finding means that polydimethylsiloxanes in which 0.8 4 mol % of the siloxane units carry a silanol group are optimum in terms of defoamer activity.

Given that the activity of the defoamer formulations thus produced is deserving of improvement, it is often proposed that pretreated hydrophobicized silicas be used in place of the hydrophilic silica. According to U.S. Pat. No. 3,113,930 A, joint heating of the silica with the polydimethylsiloxane is advantageous even in processes using pretreated hydrophobicized silica. In the process of GB 1549884 A1 the pretreated hydrophobic silica is added at the emulsifying stage; EP 23533 B1 selects the appropriate pretreated hydrophobic silica on the basis of the specified methanol wettability; U.S. Pat. No. 4,145,308 A improves the incorporation of the pretreated hydrophobic silica by adding oleic acid.

According to DE 19504645 C1, pretreated hydrophobic silica is added to formulations prepared by heating hydrophilic silica in polydimethylsiloxanes, for the purpose of achieving improved activity of the defoamer formulations thus produced.

In U.S. Pat. No. 6,656,975 B1, pretreated hydrophobic silicas are used so that the contact angle between the defoamer formulation, an encapsulant, and an organic carrier liquid is less than 130°, thereby facilitating encapsulation and production of defoamer dispersions.

The methods for the production of defoamer formulations that use pretreated hydrophobic silicas have the disadvantage that they are uneconomical by virtue of the high price of the pretreated hydrophobic silicas. The defoamer formulations produced in accordance with the prior art have the further disadvantage, moreover, that they do not always exhibit a sufficiently long-lasting activity in highly foaming, surfactant-rich systems, or that on account of the high viscosity they are difficult to handle and in storage are not stable.

SUMMARY OF THE INVENTION

The object of the invention was therefore to provide an economical method for the production of defoamer formulations, producing defoamer formulations which do not have the abovementioned disadvantages, exhibit an improved activity, more particularly an improved long-term activity, in surfactant-rich, highly foaming media in particular, but which nevertheless are easy to handle, i.e., do not display high viscosities, and for which the viscosity during storage should not be subject to any significant alteration. These and other objects are achieved by admixing a polyorganosiloxane having a defined but relatively low proportion of silicon-bonded hydroxyl groups and/or alkoxy groups with hydrophilic silica, optionally with additional ingredients, measuring the viscosity of the mixture, and heating until the viscosity has been reduced by at least 50%.

DETAILED DESCRIPTION OF THE PREFERRED EMBODIMENTS

The invention provides a method for the production of defoamer formulations using hydrophilic silicas that involves (i) in a first step mixing (A) 100 parts of at least one polyorganosiloxane composed of units of the general formula $$R_a R^1 O)_b SiO_{(4-a-b)/2} \quad (I),$$

in which R can be identical or different and denotes hydrogen or a monovalent, substituted or unsubstituted, saturated or unsaturated hydrocarbon radical having 1 to 30 carbon atoms per radical, R¹ can be identical or different and denotes a hydrogen atom or a monovalent, substituted or unsubstituted, saturated or unsaturated hydrocarbon radical having 1 to 30 carbon atoms, preferably 1 4, carbon atoms per radical, a is 0, 1, 2 or 3, b is 0, 1, 2 or 3, preferably 0 or 1, the sum a+b being ≦3, with the proviso that in 0.01% to 0.2% of all the units of the general formula (I), preferably in 0.02% to 0.15% of all the units of the general formula (I), more preferably in 0.05% to 0.1% of all the units of the general formula (I), based in each case on the total number of units of formula (I), b is other than 0, preferably 1, while in the remaining units of the formula (I) b is 0, with (B) 0.1 to 100 parts, preferably 1 to 15 parts, of at least one amorphous, hydrophilic, precipitated or fumed silica having a BET surface area of 20 1000 m²/g, preferably 50 800 m²/g, more preferably 80 500 m²/g, (C) 0 to 50 parts, preferably 1 to 50 parts, of a silicone resin composed substantially of units of the general formula $R_3SiO_{1/2}$ and $SiO_{4/2}$, R having the definition indicated above, (D) 0 to 200 parts, preferably 1 to 200 parts, of a polyorganosiloxane composed of units of the formula $$R_{a'}(R^2O)_{b'}SiO_{(4-a'-b')/2} \quad (II),$$

where R has the definition indicated for it above, $R^2$ can be identical or different and denotes a hydrogen atom or a monovalent, substituted or unsubstituted, saturated or unsaturated hydrocarbon radical having 1 to 30, preferably 6 to 30, carbon atoms per radical, a' is 0, 1, 2 or 3, b' is 0, 1, 2 or 3, preferably 0 or 1, the sum a'+b' being 3, with the proviso that in less than 0.01% or in more than 0.2% of all the units of the general formula (II), preferably in more than 1%, with particular preference in more than 5%, of all the units of the general formula (II), based in each case on the total number of units of the formula (II), b' is other than 0, preferably 1, while in the remaining units of the formula (II) b' is 0, and if desired (E) 0 5.0 parts of an alkaline or acidic catalyst and if desired (F) 0 1000 parts of an organic compound containing no silicon, and (ii) in a second step heating this mixture to a temperature of 50-250° C., heating being continued at least until the viscosity has a value of less than 50%, preferably less than 40%, more preferably less than 30% of the viscosity, as measured using a cone/plate viscometer at a temperature of 25° C. and a shear rate of 1/s, of the mixture prepared in the first step prior to said heating.

The defoamer formulations produced by the method of the invention have the advantage of a significantly improved activity in tandem with low and virtually constant viscosity. As well as low viscosity, which is needed for the defoamer formulation to be easy to handle in further processing, such as during emulsification, for example, it is also important for the viscosity on storage not to undergo any significant alterations—in other words, that the defoamer formulation is stable in this respect as well. Preferably the viscosity on room-temperature storage alters by less than 25%, more preferably by less than 10%.

It was not possible to deduce from the prior art that a method for the production of defoamer formulations using hydrophilic silica would produce products having much better activity and also lower and more stable viscosity if that method were to be carried out using a polyorganosiloxane (A) which contains a low but defined fraction of siloxane units containing hydroxyl or alkoxy groups, the mixture of this polysiloxane and the hydrophilic silica being heated until the viscosity was less than 50%, preferably less than 40%, more preferably less than 30% of the viscosity, as measured using a cone/plate viscometer at a temperature of 25° C. and a shear rate of 1/s, prior to said heating.

Examples of radical R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical and 2-ethylhexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl, and methylcyclohexyl radicals; alkenyl radicals such as the vinyl, 5-hexenyl, cyclohexenyl, 1-propenyl, allyl, 3-butenyl, and 4-pentenyl radicals; alkynyl radicals such as the ethynyl, propargyl, and 1-propynyl radicals; aryl radicals such as the phenyl, naphthyl, anthryl, and phenanthryl radical; alkaryl radicals such as o, m, and p-tolyl radicals, xylyl radicals, and ethylphenyl radicals; and aralkyl radicals such as the benzyl radical, and the α- and the β-phenylethyl radicals.

Examples of substituted radicals R are haloalkyl radicals such as the 3,3,3-trifluoro-n-propyl radical, the 2,2,2,2',2',2'-hexafluoroisopropyl radical, the heptafluoroisopropyl radical, and haloaryl radicals such as the o, m, and p-chlorophenyl radical, and also substituted alkyl radicals such as the cyanoethyl, glycidyloxypropyl, polyalkylene glycol propyl, aminopropyl, and aminoethylaminopropyl radicals. Preferably more than 80 mol % of the radicals R are methyl groups.

Examples of radicals $R^1$ are linear or branched alkyl radicals as indicated above for R, while examples of radicals $R^2$ are linear or branched alkyl radicals as indicated above for R.

Preferably used as polyorganosiloxanes (A) in the first step of the method are linear polydiorganosiloxanes which if desired may contain units of the formula $RSiO_{3/2}$ (R having the definition indicated for it above) and $SiO_2$. The polydiorganosiloxanes (A) preferably containing not more than 2% of $RSiO_{3/2}$ or $SiO_{4/2}$ units.

The sum a+b in the polyorganosiloxanes (A) composed of units of the formula (I) preferably has a value on average of preferably 1.5 to 2.4, more preferably 1.8 to 2.3, and with particular preference 1.9 to 2.1.

Examples of polyorganosiloxanes (A) are polyorganosiloxanes which are composed of the following units (percentages based on the total number of units in the polyorganosiloxanes (A)):

| | | |
|---|---|---|
| (A1): | 98.0% | $(CH_3)_2SiO_{2/2}$ |
| | 1.80% | $(CH_3)_3SiO_{1/2}$ |
| | 0.20% | $HO(CH_3)_2SiO_{1/2}$ or $OH(CH_3)SiO_{2/2}$ |
| (A2): | 98.5% | $(CH_3)_2SiO_{2/2}$ |
| | 1.35% | $(CH_3)_3SiO_{1/2}$ |
| | 0.15% | $HO(CH_3)_2SiO_{1/2}$ or $OH(CH_3)SiO_{2/2}$ |
| (A3): | 99.2% | $(CH_3)_2SiO_{2/2}$ |
| | 0.70% | $(CH_3)_3SiO_{1/2}$ |
| | 0.1% | $CH_3O(CH_3)_2SiO_{1/2}$ or $CH_3O(CH_3)SiO_{2/2}$ |
| (A4): | 99.5% | $(CH_3)_2SiO_{2/2}$ |
| | 0.47% | $(CH_3)_3SiO_{1/2}$ |
| | 0.03% | $HO(CH_3)_2SiO_{1/2}$ or $OH(CH_3)SiO_{2/2}$ |
| (A5): | 99.63% | $(CH_3)_2SiO_{2/2}$ |
| | 0.22% | $(CH_3)_3SiO_{1/2}$ |
| | 0.15% | $HO(CH_3)_2SiO_{1/2}$ or $OH(CH_3)SiO_{2/2}$ |
| (A6): | 99.17% | $(CH_3)_2SiO_{2/2}$ |
| | 0.03% | $CH_3SiO_{3/2}$ |

-continued

|  |  |  |
|---|---|---|
|  | 0.72% | $(CH_3)_3SiO_{1/2}$ |
|  | 0.08% | $HO(CH_3)_2SiO_{1/2}$ or $OH(CH_3)SiO_{2/2}$ |
| (A7): | 98.769% | $(CH_3)_2SiO_{2/2}$ |
|  | 0.03% | $CH_3SiO_{3/2}$ |
|  | 0.001% | $SiO_{4/2}$ |
|  | 1.08% | $(CH_3)_3SiO_{1/2}$ |
|  | 0.12% | $HO(CH_3)_2SiO_{1/2}$ or $OH(CH_3)SiO_{2/2}$ |
| (A8): | 99.80% | $(CH_3)_2SiO_{2/2}$ |
|  | 0.01% | $CH_3SiO_{3/2}$ |
|  | 0.16% | $(CH_3)_3SiO_{1/2}$ |
|  | 0.04% | $HO(CH_3)_2SiO_{1/2}$ or $OH(CH_3)SiO_{2/2}$ |
| (A9): | 99.63% | $(CH_3)_2SiO_{2/2}$ |
|  | 0.26% | $(CH_3)_3SiO_{1/2}$ |
|  | 0.11% | $C_2H_5O(CH_3)_2SiO_{1/2}$, $C_2H_5O(CH_3)SiO_{2/2}$, $HO(CH_3)_2SiO_{1/2}$ or $OH(CH_3)SiO_{2/2}$ |
| (A10): | 98.0% | $(CH_3)_2SiO_{2/2}$ |
|  | 0.01% | $CH_3SiO_{3/2}$ |
|  | 1.85% | $(CH_3)_3SiO_{1/2}$ |
|  | 0.15% | $C_8H_{17}O(CH_3)_2SiO_{1/2}$ or $OH(CH_3)SiO_{2/2}$ |

The polyorganosiloxanes (A) preferably have a viscosity of 10 to 1,000,000 mPa·s at 25° C., more preferably 50 to 50,000 mPa·s at 25° C., and with particular preference, 100 to 20,000 mPa·s at 25° C.

The Si-bonded $R^1O$ groups in the polyorganosiloxanes (A) composed of units of the formula (I) are preferably hydroxyl groups or $C_{1-4}$ alkoxy groups, such as $C_2H_5O$ groups. The polyorganosiloxanes (A) composed of units of the formula (I) preferably contain these Si-bonded $R^1O$ groups in amounts of 0.005 to 0.099 mol %, more preferably in amounts of 0.01 to 0.074 mol %, and with particular preference in amounts of 0.02 to 0.05 mol %, based in each case on all of the silicon-bonded radicals R and $R^1O$.

Silicas (B) used in the first step of the method are preferably hydrophilic amorphous silicas having a BET surface area of 20-1000 m²/g, more preferably 50-800 m²/g, and most preferably 80-500 m²/g. These hydrophilic silicas may be fumed or precipitated silicas and they preferably have a particle size of less than 10 μm and an agglomerate size of less than 100 μm.

In combination with the silicas (B) it is possible to use silicone resins (C). The silicone resins (C) are polysiloxanes of nonlinear construction which as well as $R_3SiO_{1/2}$ (M) and $SiO_{4/2}$ (Q) units may also contain units of the formula $RSiO_{3/2}$ (T) and $R_2SiO_{2/2}$ (D) units. Preference is given to using resins which are composed of $R_3SiO_{1/2}$ (M) and $SiO_{4/2}$ (Q) units; these resins are also referred to as MQ resins. The molar ratio of M to Q units is situated preferably in the range from 0.5 to 2.0, more preferably in the range from 0.6 to 1.0. These silicone resins may further contain up to 10% by weight of free hydroxyl or alkoxy groups.

In one preferred version of the invention the defoamers contain 1-5 parts of silica (B) and 5-15 parts of MQ resins (C) per 100 parts of component A.

Used as component (D) are, for example, polydiorganosiloxanes preferably having a viscosity of 100 to 1,000,000 mPa·s at 25° C. These polydiorganosiloxanes may be branched, for example, as a result of the incorporation of $RSiO_{3/2}$ (R having the definition indicated for it above) or $SiO_{4/2}$ units. These branched or part-crosslinked siloxanes then have viscoelastic properties. The polydiorganosiloxanes (D) preferably containing not more than 2% of $RSiO_{3/2}$ or $SiO_{4/2}$ units.

In one preferred embodiment use is made as component (D) of 0.1 to 50 parts, with particular preference 1 to 25 parts, more preferably 2 to 15 parts of polyorganosiloxanes composed of units of the general formula (II) where R is a methyl radical, $R^2$ is a linear and/or branched hydrocarbon radical having 6 to 30 carbon atoms, and in 1% to 10%, preferably 5% to 10%, of all the units of the formula (II), based on the total number of units, b' is other than 0, preferably being 1, while in the remaining units of the formula (II) b' is 0. Preferably, b' adopts on average a value of 0.005 to 0.1, and the sum (a'+b') has on average a value of 1.9 to 2.1. Products of this kind are obtainable for example through alkali-catalyzed condensation of silanol-terminated polydimethylsiloxanes, preferably with a viscosity of 50 to 50,000 mPa·s at 25° C. and aliphatic alcoholics having more than 6 carbon atoms, such as isotridecyl alcohol, n-octanol, stearyl alcohol, 4-ethylhexadecanol or eicosanol.

Catalysts (E) can be added in the first step of the method. Examples of alkaline catalysts are alkali metal and alkaline earth metal hydroxides, such as NaOH, KOH, CsOH, LiOH, and $Ca(OH)_2$. Examples of acidic catalysts are hydrochloric acid, sulfuric acid, and phosphorus nitride chlorides.

As a further component (F) it is possible, in the first step of the method or else later, to add preferably water-insoluble organic compounds having a boiling point of greater than 100° C. Examples of such organic compounds are mineral oils, natural oils, isoparaffins, polyisobutylenes, residues from the synthesis of alcohols by the oxo process, esters of low molecular weight synthetic carboxylic acids, fatty acid esters, fatty alcohols, ethers of low molecular weight alcohols, phthalates, esters of phosphoric acid, and waxes. The organic compounds (F) are preferably used in amounts of 0 to 200 parts per 100 parts of polyorganosiloxanes (A).

As further components for the production of the defoamer formulations of the invention it is possible to add optionally modified polysiloxanes, which may be linear or branched and which carry at least one polyether moiety, in amounts of preferably 1 to 50 parts per 100 parts of component (A). Polyether-modified polysiloxanes of this kind are known and are described for example in EP 1076073 A.

The mixing of components (A), (B), (C), (D), and, if desired, further components, such as (E) and (F), may take place discontinuously or continuously by means of simple stirring, kneading and/or else using high shearing forces in colloid mills, dissolvers, or rotor-stator homogenizers, the mixing, such as stirring, and/or the homogenizing preferably producing an energy input of at least 0.1 kJ/kg, with particular preference of 1 to 10,000 kJ/kg, most preferably of 5 to 1000 kJ/kg. This mixing operation may take place under reduced pressure in order to prevent the incorporation of air which is present in highly disperse fillers.

In the second step of the method the mixture is heated, preferably at 100 to 200° C. The mixing and/or homogenizing may be continued at the heating stage. Heating may take place under inert gas (such as helium, argon or nitrogen), under reduced pressure or else in the presence of air. As part of the method of the invention it is also possible for the mixing, for example, of components (A), (B), (C), and (D) and any further components to take place itself at an elevated temperature; in other words, for the first and second steps of the method to run wholly or partly simultaneously.

The mixture is preferably heated until the viscosity of the mixture has a value of less than 40%, in particular a value of 5% to 25%, of the viscosity the mixture produced in the first step had prior to said heating. The viscosity here is defined as the viscosity determined at a shear rate of 1/s using a cone/plate viscometer. This reaction can be assisted by the addition of catalysts, such as KOH, or the addition of silanes or silazanes.

The defoamer formulations produced in accordance with the invention are notable for their high activity and for a viscosity which is constant on storage.

The defoamer formulation produced in accordance with the invention can be added to the foaming liquors directly, in solution in suitable solvents, such as methyl ethyl ketone or tert-butanol, as a powder or as an emulsion.

The emulsifiers required for the preparation of the emulsions may be anionic, cationic or nonionic and are known to the skilled person for the preparation of stable silicone emulsions. It is preferred to use emulsifier mixtures, in which case there should be at least one nonionic emulsifier present, such as, for example, sorbitan fatty acid esters, ethoxylated sorbitan fatty acid esters, ethoxylated fatty acids, ethoxylated linear or branched alcohols having 10 to 20 carbon atoms and/or glycerol esters. In addition it is possible to add compounds known as thickeners, such as polyacrylic acid, polyacrylates, cellulose ethers such as carboxymethylcellulose and hydroxyethylcellulose, natural gums such as xanthan gum, and polyurethanes, and also preservatives and other typical additions known to the skilled worker.

Technologies for the preparation of silicone emulsions are known. Typically the preparation is accomplished by simply stirring together all of the ingredients and, where appropriate, subsequently homogenizing the mixture using rotor-stator homogenizers, colloid mills, jet dispersers or high-pressure homogenizers.

The defoamer formulations produced in accordance with the invention can also be processed further into free-flowing powders. These powders are preferred in the context, for example, of use in powder laundry detergents. These defoamer powders contain, for example, 2-20% by weight of the defoamer formulations. Examples of carriers employed include zeolites, sodium sulfate, cellulose derivatives, urea, and sugars. Examples of further possible ingredients of the defoamer powders include waxes and organic polymers, of the kind described in EP 887097 A and EP 1060778 A, for example. These powders are produced by methods known to the skilled worker, such as spray drying or agglomerative granulation.

The defoamer formulations produced in accordance with the invention can be used wherever disruptive foam is to be suppressed. This is the case, for example, in nonaqueous systems, such as in tar distillation or a petroleum processing. The defoamer formulations of the invention are suitable more particularly for controlling foam in aqueous surfactant systems, an application in which they are distinguished from prior-art defoamer formulations by a higher and longer-lasting activity at low levels of addition.

The defoamer formulations of the invention can be used for defoaming wastewaters, intensely agitated liquids, distillation, washing, coloring or finishing operations in household or industry, or chemical digestion or conversion operations, such as chemical syntheses, cellulose production or papermaking or petroleum processing (refining), for defoaming in fermentative operations, in the preparation of dispersions, in the preparation or application of formulated products such as, for example, sprays, cosmetics or drugs or of foams which occur during dispensing operations.

WORKING EXAMPLES

All of the parts indicated below (unless indicated otherwise) are based on weight. The viscosities relate to 25° C. and a shear rate of 1/s.

Tests of Defoamer Activity

1. Antifoam Index AFI

In an apparatus in accordance with DE-A 2551260, 200 ml of a 4% strength by weight aqueous solution of a sodium alkylsulfonate (Mersolat) containing 10 mg of the defoamer under investigation (in solution in 10 times the amount of methyl ethyl ketone) were foamed for 1 minute using two counter rotating stirrers. Subsequently the collapse of the foam was recorded. The area of the plot of foam height versus time was used to calculate the antifoam index. The lower this index, the more effective the defoamer.

2. Stirring Test 300 ml of a solution containing 1% by weight of a defoamer-free alkaline washing powder were foamed for 5 minutes with a stirrer at a speed of 1000 revolutions/min. Subsequently 100 µl of a 10% strength by weight solution of the defoamer in methyl ethyl ketone were added and stirring was continued for 25 minutes more. Throughout the time the foam height was recorded.

As a measure of the activity, the average foam height relative to the foam height without defoamer was calculated after 2-3 min. The lower the resulting figure, the more active the defoamer.

In the examples below, % of units means the fraction of the corresponding siloxane units relative to the total number of all the siloxane units in the siloxane.

Example 1

91 parts of a polydimethylsiloxane (A), which is composed of 99.2% of units of the formula $(CH)_2SiO_{2/2}$ and 0.8% of units of the formula $(CH_3)_3SiO_{1/2}$, and in which 0.03% of all the units of the polydimethylsiloxane carry Si-modified ethoxy groups, 4.5 parts of hydrophilic fumed silica (B) having a BET surface area of 200 m²/g, and 4.5 parts of a polydimethylsiloxane (D), which is composed of 92% of units of the formula $(CH_3)_2SiO_{2/2}$ and 8% of units of the formula $(CH_3)_2(OH)SiO_{1/2}$, are intimately mixed using a dissolver disc. This mixture had a viscosity of 200,000 mPas.

This mixture was then heated at 150° C. for 4 hours, in the course of which the viscosity had dropped to 30,100 mPas, i.e., 15% of the initial viscosity of the mixture.

The stirring test (test 2) carried out with this mixture gave a foam height of 30 (see Table 1). The defoamer is therefore very effective.

The defoamer formulation thus obtained was then tested for its stability. The results of this test are summarized in Table 1.

Comparative Experiment C1:

91 parts of a polydimethylsiloxane, which is composed of 99.2% of units of the formula $(CH_3)_2SiO_{2/2}$ and 0.8% of units of the formula $(CH_3)_3SiO_{1/2}$, and in which there are no detectable radicals of the formula $OR^1$ attached to the silicon, 4.5 parts of hydrophilic fumed silica (B) having a BET surface area of 200 m²/g, and 4.5 parts of a polydimethylsiloxane (D), which is composed of 92% of units of the formula $(CH_3)_2SiO_{2/2}$ and 8% of units of the formula $(CH_3)_2(OH)SiO_{1/2}$, are intimately mixed using a dissolver disc. This mixture had a viscosity of 124,000 mPas.

This mixture was then heated at 150° C. for 4 hours, in the course of which the viscosity had dropped to 70,000 mPas, i.e., 56% of the initial viscosity of the mixture.

The stirring test (test 2) carried out with the defoamer formulation thus produced gave a foam height of 75 (see Table 1). The defoamer has a poor, inadequate action.

The defoamer formulation thus obtained was then tested for its stability. The results of this test are summarized in Table 1.

Example 2

100 parts of a polydimethylsiloxane (A), which is composed of 99.2% of units of the formula $(CH_3)_2SiO_{2/2}$ and 0.8% of units of the formula $(CH_3)_3SiO_{1/2}$, and in which 0.08% of all the units of the polydimethylsiloxane carry hydroxyl groups attached to the silicon (Si—OH), 5 parts of hydrophilic fumed silica (B) having a BET surface area of 200 m$^2$/g, and 5 parts of a polydimethylsiloxane (D), which is composed of 92% of units of the formula $(CH_3)_2SiO_{2/2}$ and 8% of units of the formula $(CH_3)_2(OH)SiO_{1/2}$, are intimately mixed using a dissolver disc. This mixture had a viscosity of 55,000 mPas.

This mixture was then heated at 150° C. for 7 hours, in the course of which the viscosity had dropped to 5600 mPas, i.e., 10% of the initial viscosity of the mixture.

The antifoam index AFI was ascertained. The results are summarized in Table 1.

The defoamer formulation thus obtained was then tested for its stability. The results of this test are likewise summarized in Table 1.

Comparative Experiment C2:

100 parts of a polydimethylsiloxane, which is composed of 99.2% of units of the formula $(CH_3)_2SiO_{2/2}$ and 0.8% of units of the formula $(CH_3)_3SiO_{1/2}$, and in which there are no detectable radicals of the formula $OR^1$ attached to the silicon, 5 parts of hydrophilic fumed silica (B) having a BET surface area of 200 m$^2$/g, and 5 parts of a polydimethylsiloxane (D), which is composed of 92% of units of the formula $(CH_3)_2SiO_{2/2}$ and 8% of units of the formula $(CH_3)_3SiO_{1/2}$ are intimately mixed using a dissolver disc. This mixture had a viscosity of 48,000 mPas.

This mixture was then heated at 150° C. for 7 h, in the course of which the viscosity had dropped to 32,500 mPas, i.e., 68% of the initial viscosity of the mixture.

The antifoam index AFI was ascertained. The results are summarized in Table 1.

The defoamer formulation thus obtained was then tested for its stability. The results of this test are likewise summarized in Table 1.

TABLE 1

| | Example or Comparative experiment | | | |
|---|---|---|---|---|
| | 1 | C1 | 2 | C2 |
| AFI | — | — | 1037 | 2454 |
| Stirring test in % | 30 | 75 | — | — |
| Viscosity (1) after heating [mPa · s] | 30.100 | 70.000 | 5600 | 32.500 |
| Viscosity (2) after 3 months [mPa · s] | 28.600 | 53.700 | 5190 | 28.250 |
| Viscosity (2)/(1) in % | 95.0 | 76.7 | 92.7 | 86.9 |

It is clear that with the inventively produced defoamer of Example 2 the AFI is not even 50% of the AFI of the noninventive defoamer of Comparative experiment 2, meaning that it is twice as active. This is all the more surprising given the fact that component (D) in both cases introduces a high fraction of Si-bonded OH groups, so that the smaller amounts of SiOH from component (A) were surprising in their effect. The inventively produced defoamer of Example 1 as well is outstandingly active, as is apparent from the less than half as high foam height as compared with Comparative example 1 in the stirring test.

The stability of the inventively produced defoamers is outstanding. On storage, the viscosity alters by less than 10% from the viscosity after heating, whereas this alteration in viscosity is higher in the case of the noninventive, comparative examples.

Example 3

89.3 parts of a polydimethylsiloxane (A), composed of 99.5% of $(CH_3)_2SiO$ units and 0.5% of $(CH_3)_3SiO_{1/2}$ units, and in which 0.07% of all the units of the polydimethylsiloxane carry hydroxyl groups (Si—OH), 5 parts of hydrophilic fumed silica (B) having a BET surface area of 300 m$^2$/g, 3 parts of a polydimethylsiloxane (D) having a terminal $C_{20}$ alkyl group, 2 parts of a silicone resin (C) composed substantially of units of the general formula $(R_3SiO)_{0.5}$ and $SiO_2$ units, and 0.7 part of a 20% strength methanolic KOH (E) are intimately mixed using a dissolver disc.

This mixture had a viscosity of 188,000 mPas.

This mixture was then heated at 150° C. for 4 hours, in the course of which the viscosity had dropped to 27,200 mPas, i.e., 14% of the initial viscosity of the mixture.

The defoamer formulation thus obtained was then tested for the antifoam index AFI, the stirring test, and the stability. The results of these tests are summarized in Table 2.

Comparative Experiment C3:

89.3 parts of a polydimethylsiloxane, composed of 99.5% of $(CH_3)_2SiO$ units and 0.5% of $(CH_3)_3SiO_{0.5}$ units, and in which there are no detectable radicals of the formula $OR^1$ attached to the silicon, 5 parts of hydrophilic fumed silica (B) having a BET surface area of 300 m$^2$/g, 3 parts of a polydimethylsiloxane (D) having a terminal $C_{20}$ alkyl group, 2 parts of a silicone resin (C) composed substantially of units of the general formula $(R_3SiO)_{0.5}$ and $SiO_2$ units, and 0.7 part of a 20% strength methanolic KOH (E) are intimately mixed using a dissolver disc.

This mixture had a viscosity of 31,300 mPas.

This mixture was then heated at 150° C. for 4 hours, in the course of which the viscosity had dropped to 28,670 mPas, i.e., 92% of the initial viscosity of the mixture.

The defoamer formulation thus obtained was then tested for the antifoam index AFI, the stirring test, and the stability. The results of these tests are summarized in Table 2.

Example 4

89.3 parts of a polydimethylsiloxane (A), composed of 99.5% of $(CH_3)_2SiO$ units and 0.5% of $(CH_3)_3SiO$ units, and in which 0.030% of all the units of the polydimethylsiloxane carry hydroxyl groups (Si—OH), 5 parts of hydrophilic fumed silica (B) having a BET surface area of 300 m$^2$/g, 3 parts of a polydimethylsiloxane (D) having a terminal $C_{20}$ alkyl group, 2 parts of a silicone resin (C) composed substantially of units of the general formula $(R_3SiO)_{0.5}$ and $SiO_2$ units, and 0.7 part of a 20% strength methanolic KOH (E) are intimately mixed using a dissolver disc.

This mixture had a viscosity of 205,000 mPas.

This mixture was then heated at 150° C. for 4 hours, in the course of which the viscosity had dropped to 27,000 mPas, i.e., 13% of the initial viscosity of the mixture.

The defoamer formulation thus obtained was then tested for the antifoam index AFI, the stirring test, and the stability. The results of these tests are summarized in Table 2.

Comparative Experiment C4:

89.3 parts of a polydimethylsiloxane, composed of 100% of $(CH_3)_2SiO$ units, and in which 0.9% of all the units of the polydimethylsiloxane contain hydroxyl groups (Si—OH), 5 parts of hydrophilic fumed silica (B) having a BET surface area of 300 $m^2/g$, 3 parts of a polydimethylsiloxane (D) having a terminal $C_{20}$ alkyl group, 2 parts of a silicone resin (C) composed substantially of units of the general formula $(R_3SiO)_{0.5}$ and $SiO_2$ units, and 0.7 part of a 20% strength methanolic KOH (E) are intimately mixed using a dissolver disc. The mixture obtained had a viscosity of 846 mPas.

This mixture was then heated at 150° C. for 4 hours, in the course of which the viscosity had dropped to 565 mPas, i.e., 67% of the initial viscosity of the mixture.

The defoamer formulation thus obtained was then tested for the antifoam index AFI, the stirring test, and the stability. The results of these tests are summarized in Table 2.

The mixture is not stable on storage. As a result of solid sedimentation, it becomes inhomogeneous and hence unusable.

Comparative Experiment C5

89.3 parts of a mixture of the polydimethylsiloxanes used in comparative examples C3 and C4—that is, polydimethylsiloxane composed of 99.5% of $(CH_3)_2SiO$ units and 0.5% of $(CH_3)_3SiO_{0.5}$ units, and in which there are no detectable radicals of the formula $OR^1$ attached to the silicon, and polydimethylsiloxane composed of 100% of $(CH_3)_2SiO$ units and containing 0.9% of hydroxyl groups attached to the silicon (Si—OH), the mixture being adjusted such that 0.03% of all the units of the polydimethylsiloxane of the mixture carry hydroxyl groups attached to the silicon (Si—OH), 5 parts of hydrophilic fumed silica (B) having a BET surface area of 300 $m^2/g$, 3 parts of a polydimethylsiloxane (D) having a terminal $C_{20}$ alkyl group, 2 parts of a silicone resin (C) composed substantially of units of the general formula $(R_3SiO)_{0.5}$ and $SiO_2$ units, and 0.7 part of a 20% strength methanolic KOH (E) are intimately mixed using a dissolver disc.

This mixture had a viscosity of 420,000 mPas.

This mixture was then heated at 150° C. for 4 hours, in the course of which the viscosity had dropped to 350,000 mPas, i.e., 83% of the initial viscosity of the mixture.

The defoamer formulation thus obtained was then tested for the antifoam index AFI, the stirring test, and the stability. The results of these tests are summarized in Table 2.

The mixture undergoes gelling on storage and is therefore unusable.

TABLE 2

| | Example or Comparative experiment | | | | |
|---|---|---|---|---|---|
| | 3 | 4 | C3 | C4 | C5 |
| AFI | 401 | 310 | 912 | 1560 | 611 |
| Stirring test in % | 32 | 29 | 60 | 81 | 53 |

TABLE 2-continued

| | Example or Comparative experiment | | | | |
|---|---|---|---|---|---|
| | 3 | 4 | C3 | C4 | C5 |
| Viscosity (1) after heating [mPa · s] | 27.200 | 27.000 | 28.670 | | 350.000 |
| Viscosity (2) after 3 months [mPa · s] | 28.900 | 26.400 | 8.300 | Filler settled* | Gel* |
| Viscosity (2)/(1) in % | 109.4 | 97.7 | 29 | — | — |

*Viscosity not measurable

The inventive defoamers (Table 2) not only are much more effective than the noninventive defoamers in terms of the AFI and the stirring test, but also have good stability, in contrast to the noninventive defoamers, which are unstable in viscosity or which form a solid sediment or undergo gelling. The viscosity of the inventively produced defoamers alters by less than 10% over 3 months of storage at room temperature.

The invention claimed is:

1. A method for the production of defoamer formulations using hydrophilic silicas, comprising
   (i) mixing
   (A) 100 parts of at least one polyorganosiloxane comprising units of the formula $$R_a(R^1O)_b SiO_{(4-a-b)/2} \qquad (I),$$

in which R are identical or different and are hydrogen or a monovalent, substituted or unsubstituted, saturated or unsaturated hydrocarbon radical having 1 to 30 carbon atoms per radical,
   $R^1$ are identical or different and are a hydrogen atom or a monovalent, substituted or unsubstituted, saturated or unsaturated hydrocarbon radical having 1 to 30 carbon atoms per radical,
   a is 0, 1, 2 or 3,
   b is 0 or 1,
   the sum a+b being $\leq 3$,
   with the proviso that in 0.01% to 0.15% of all the units of the formula (I), based on the total number of units of formula (I), b is other than 0, while in the remaining units of the formula (I) b is 0, and the polyorganosiloxane (I) has a viscosity of 100 to 20,000 mPa·s at 25° C.,
   with
   (B) 0.1 to 100 parts of at least one amorphous, hydrophilic, precipitated or fumed silica having a BET surface area of 20-1000 $m^2/g$,
   (C) 0 to 50 parts of silicone resin(s) composed substantially of units of the general formula $R_3SiO_{1/2}$ and $SiO_{4/2}$, R having the definition indicated above,
   (D) 0 to 200 parts of one or more polyorganosiloxanes comprising units of the formula $$(R_{a'}R^2O)_{b'}SiO_{(4-a'-b')/2} \qquad (II),$$

where R has the definition indicated for it above,
   $R^2$ are identical or different and are a hydrogen atom or a monovalent, substituted or unsubstituted, saturated or unsaturated hydrocarbon radical having 1 to 30 carbon atoms per radical,
   a' is 0, 1, 2 or 3,
   b' is 0 or 1,
   the sum a'+b' being $\leq 3$, with the proviso that in less than 0.01% or in more than 1% of all the units of the formula (II), based on the total number of units of the formula (II), b' is other than 0, while in the remaining units of the formula (II) b' is 0, (E) optionally 0-5.0 parts of an alkaline or acidic catalyst and (F) optionally 0-1000 parts of an organic compound containing no silicon, and (ii) heating this mixture to a temperature of 50 to 250° C., heating being continued at least until the viscosity has a value of less than 50% of the viscosity, as measured using a cone/plate viscometer at a temperature of 25° C. and a shear rate of 1/s, of the same mixture prepared without heating.

2. The method of claim 1, wherein 0.02% to 0.15% of all the units of the formula (I), based on the total number of units of the formula (I), b is 1, while in the remaining units of the formula (I) b is 0.

3. The method of claim 2, wherein the $R^1O$ groups in the polyorganosiloxanes (A) comprise hydroxyl groups.

4. The method of claim 2, wherein the $R^2O$ groups in the polyorganosiloxanes (D) comprise $C_{1-30}$ alkoxy groups.

5. A defoamer composition comprising at least one defoamer prepared by the method of claim 2.

6. The method of claim 1, wherein the $R^1O$ groups in the polyorganosiloxanes (A) comprise hydroxyl groups.

7. A defoamer composition comprising at least one defoamer prepared by the method of claim 6.

8. The method of claim 1, wherein the $R^2O$ groups in the polyorganosiloxanes (D) comprise $C_{1-30}$ alkoxy groups.

9. A defoamer composition comprising at least one defoamer prepared by the method of claim 8.

10. The method of claim 1, wherein 0.1 to 50 parts of polyorganosiloxane (D) are used per 100 parts of polyorganosiloxane (A), and in the polyorganosiloxanes (D) $R^2$ is a linear and/or branched hydrocarbon radical having 6 to 30 carbon atoms.

11. A defoamer composition comprising at least one defoamer prepared by the method of claim 10.

12. The method of claim 1, wherein water-insoluble organic compounds having a boiling point of greater than 100° C. are used as organic compounds (F) containing no silicon.

13. A defoamer composition comprising at least one defoamer prepared by the method of claim 12.

14. A method for reducing foam in a liquid, comprising adding to said liquid a defoamer formulation prepared by the method of claim 1.

15. The method of claim 14, wherein the liquid is selected from the group consisting of wastewater, intensely agitated aqueous or nonaqueous liquids, washing liquids, dyeing liquids, finishes, liquor from cellulose production, liquor from papermaking, and fermentation liquors.

16. The method of claim 14, wherein the liquid is a spray, cosmetic, drug, paint, or ink.

17. A defoamer composition comprising at least one defoamer prepared by the method of claim 1.

18. The method of claim 1 wherein no polyorganosiloxane (II) is present.

19. A defoamer composition comprising at least one defoamer prepared by the method of claim 18.

* * * * *